United States Patent [19]

Gerlowski

[11] Patent Number: 4,694,693

[45] Date of Patent: Sep. 22, 1987

[54] CHECK VALVE TEST METHOD USING TRUNCATED ACCUMULATOR BLOWDOWN

[75] Inventor: Thomas J. Gerlowski, Crafton Boro, Pa.

[73] Assignee: Westinghouse Electric Corp., Pittsburgh, Pa.

[21] Appl. No.: 928,640

[22] Filed: Nov. 6, 1986

Related U.S. Application Data

[63] Continuation of Ser. No. 734,373, May 15, 1985, abandoned.

[51] Int. Cl.$^4$ ............................................ G01M 19/00
[52] U.S. Cl. ...................................................... 73/168
[58] Field of Search ................. 73/4 R, 37, 46, 168; 376/245–246, 283, 316

[56] References Cited

U.S. PATENT DOCUMENTS

| | | | |
|---|---|---|---|
| 3,485,082 | 12/1969 | Myers | 73/4 R |
| 3,819,476 | 6/1974 | Pocock et al. | 376/282 |
| 4,389,888 | 6/1983 | Morooka | 73/299 |
| 4,473,528 | 9/1984 | Kleimola | 376/282 |
| 4,515,012 | 5/1985 | Jenkins et al. | 73/168 |
| 4,548,067 | 10/1985 | Cox | 73/4 R |

OTHER PUBLICATIONS

U.S. Nuclear Regulatory Commission, Regulatory Guide, Sep. 1975, pp. P.03–P.05, Regulatory Guide 1.79 (Office of Standards Development), "Preoperational Testing of Emergency Core Cooling Systems for Pressurized Water Reactors".

Primary Examiner—Charles Frankfort
Assistant Examiner—W. Morris Worth
Attorney, Agent, or Firm—Daniel C. Abeles

[57] ABSTRACT

A method for testing a normally closed check valve connected in series with an isolation valve at the outlet of a passive injection system includes adjusting pressure upstream and downstream of the check and isolation valves to an upstream pressure higher than the downstream pressure and then opening and closing the isolation valve. In order to verify proper operation of the check valve, a preoperational test is performed to provide base line data and acceptance criteria. In a typical passive injection system having an accumulator tank, pressure and level changes of liquid in the accumulator tank are recorded during the opening and closing of the isolation valve. The recorded measurements of pressure and level during each test of the check valve are compared with the acceptance criteria to determine whether the check valve operates properly.

21 Claims, 3 Drawing Figures

CHECK VALVE TEST METHOD USING TRUNCATED ACCUMULATOR BLOWDOWN

This application is a continuation of application Ser. No. 734,373 filed May 15, 1985, now abandoned.

BACKGROUND OF THE INVENTION

1. Field of the Invention

The present invention relates in general to testing normally closed check valves at the outlet of a passive injection system, and more specifically to testing check valves connecting accumulator tanks to a reactor cooling system in a pressurized light water nuclear power system.

2. Description of the Related Art

Check valves are commonly used in many types of applications to prevent flow in a particular direction except when the pressure upstream of the check valve exceeds the pressure downstream of the check valve. One such application is in a pressurized system to maintain pressure at a certain level. In such applications, a check valve may be connected at the outlet of a tank which is pressurized to a predetermined pressure. The check valve is opened only if the pressure in the system connected downstream of the check valve falls below the predetermined safe pressure. This type of application is termed a passive injection system. Included in the types of installations which use passive injection systems are pressurized light water nuclear power systems.

A simplified diagram of a pressurized light water nuclear power system is illustrated in FIG. 1. In FIG. 1, a reactor vessel 10 generates hot pressurized water, typically at a pressure of approximately 2250 psig and a temperature of approximately 600° F., which exits the reactor vessel 10 in a pipe identified as the hot leg 15. The pressurized hot water is routed through a steam generator 20 to produce steam which may then be used to generate electricity. The water which exits the steam generator 20 via a crossover leg 25 is at a reduced temperature and passes through a pump 30 to be returned to the reactor vessel 10 via a cold leg 35. All of the above described portions of the reactor cooling system (RCS) are enclosed by a containment boundary 40.

While only one loop of hot, cold and crossover legs 15, 35 and 25, respectively, is illustrated in FIG. 1, conventional pressurized light water nuclear power systems have two (2) to four (4) such loops. All of the loops include a steam generator 20 and pump 30, but connections to emergency core cooling systems (ECCS) 45 may vary from loop to loop. One or more of the loops will also have connections to a pressurizer 50 and a chemical and volume control system (CVCS) 55 which together control the pressure in the RCS. The pressurizer 50 reduces pressure in the RCS by injecting cold water via a spray head 60 and increases pressure by heating the water using a heater 65. Volume changes caused by the changes in pressure are corrected by the CVCS 55.

Nuclear power systems are built with multiple safeguards. One of the types of safeguards are the emergency core cooling systems (ECCS) 45. As illustrated in FIG. 1, the ECCS 45 lie partially inside and partially outside the containment 40, receive hot water from the hot leg 15 and supply water to the cold leg 35. There may be several different types of systems included in the ECCS 45, each operating at different times or with different objectives. For exampe, the material supplied by an emergency core cooling system may be just water at an unregulated temperature to maintain pressure, water at a carefully controlled temperature, water mixed with boron to control the reaction in the nuclear reactor, or other materials mixed with water or another liquid. The sources of water may include large unpressurized reservoirs such as a refueling water storage tank (RWST) 100 (FIG. 2) containing 350,000 to 500,000 gallons and pressurized accumulator tanks 105 holding, e.g., 1350 cubic feet of water and nitrogen pressurized to between 500 and 700 psig.

The ECCS 45 include high pressure systems which are used to help control the reactor early in a loss of coolant accident (LOCA) and typically include a connection to a boron injection tank 110, so that boron can be added to water injected by safety injection pmps 115 in the high pressure system. Low pressure systems are included in the ECCS and are designed to supply larger volumes of water. Included in the lower pressure systems may be residual heat removal (RHR) systems which remove heat at lower temperatures from the reactor cooling system (RCS) using residual heat exchangers 120 and low pressure pumps 125.

Every two months to one year, nuclear power plants go through a cold shutdown process in order that fuel may be added to the reactor or other maintenance operations performed. The cold shutdown process involves venting steam from the steam generators 20 while stopping the nuclear reaction, i.e., stopping heat generation, so that temperature and pressure in the RCS can be gradually reduced. When the pressure is reduced to approximately 1000 psig, the emergency core cooling systems ECCS 45 are manually located out to prevent inappropriate automatic activation, thus preventing flow through the ECCS 45. At approximately 450 psig and a temperature of no greater than 350° F., flow from from as least one of the hot legs 15 through the residual heat removal (RHR) system is started using the low pressure portion of the ECCS 45 to reduce the temperature below 200° F. so that the pressure can be reduced as low as atmospheric pressure.

During the cold shutdown process, water is routed through the heat exchanger 120 (FIG. 2) in each RHRS from one of the hot legs 15 via a pipe 130 when two isolation valves 135 which are normally closed, as indicated by the dark shading in FIG. 2, are opened. At the same time, shut off valve 137 can be closed to prevent water being drawn from the RWST 100. The RHR pump 125 is turned on and water flows through check valves 140, 145 and 150. Check valve 155 prevents the water from flowing into the accumulator tank 105 and instead the water is pumped through check valve 160 to the RCS. Thus, any malfunction of check valves 140, 145, 150 or 160 will be detected during the cold shutdown process. However, there is no ordinary or normal operation of a nuclear power plant which tests the operation of check valve 155.

Section XI of the American Society of Mechanical Engineers (ASME) Code requires periodic inspections and testing of various components in nuclear power plants. Subsection IWV of Section XI addresses the testing of valves. Paragraph IWV-3520 requires that check valves be exercised at least every three months unless such operation is not practical during plant operation, which is true for the valves in the ECCS 45. All valves not tested every three month are required to be full stroke exercised during cold shutdowns (Subparagraph IWV-3522).

There are several different types of check valves. Conventional check valves include ball and swing-disk check valves. These valves can only be tested by adjusting the pressure upstream and downstream of the valve until they open. One type of check valve includes a "swing arm" on the exterior which permits mechanical actuation to test the valve. Subparagraph IWV-3522(b) permits testing by such a mechanical exerciser (swing arm).

There are several drawbacks to using a check valve having a swing arm. First, there is no way to be certain that the valve is moving when the swing arm is moved on the exterior of the valve. Second, the valve is not actually being tested in operation, i.e., due to a pressure differential upstream and downstream of the valve. Third, the axle turned by the swing arm provides an additional location for leaks to occur.

Due to the drawbacks of the wing arm type check valves, other alternatives are used for valves which are not tested by any ordinary operational procedure, including cold shutdowns. One alternative is to totally disassemble the check valve at each cold shutdown. Disassembling check valves can ensure that the check valves are still capable of movement, but like the mechanical actuation test, this does not ensure that the valves will operate at the required pressure differential. Another alternative is to simply request relief from ASME Code Section XI, Subsection IWV-3520. Although this alternative involves no testing whatsoever, it has been used by some nuclear power plants.

There is a procedure which tests the operation of check valve 155; however, this procedure is not used at each cold shutdown, but rather once every ten years or prior to initial operation and 3 times during the life of a 40 year power plant. This procedure involves a "full blowdown" of the accumulator tank 105 by opening isolation valve 165, typically a motorized gate valve, when the RCS pressure is approximately atmospheric pressure. The valves, piping and connections between the accumulator tank 105 and the cold leg 35 of the RCS are designed to withstand relatively few high pressure full blowdowns during the life of the nuclear power plant. Therefore, meeting the requirements of the ASME Code Section XI using high pressure full blowdowns would require redesign or additional analysis of the RCS and ECCS to determine whether maximum acceptable pressure and temperature differential transients resulting from operation of the accumulator tank 105 in the passive injector system are exceeded.

SUMMARY OF THE INVENTION

An object of the present invention is to provide a method which tests a normally closed check valve at an outlet of a passive injection system.

Another object of the present invention is provide a method for testing a normally closed check valve in a passive injection system without mechanical actuation of the check valve.

A further object of the present invention is to provide a method for testing a normally closed check valve, which may be repeated many times without exceeding the designed maximum acceptable pressure and temperature transients of the system.

Yet another object of the present invention is to provide a method for testing a normally closed check valve in a nuclear power system which can be performed at every cold shutdown of the nuclear power system.

The above mentioned objects are attained by providing a method for testing a normally closed check valve connected in series with an isolation valve at an outlet of a passive injection system for supplying a fluid, including performing a peroperational test to establish acceptance criteria; adjusting pressure upstream and downstream of the series connected check and isolation valves to an upstream pressure higher than the downstream pressure; and opening and closing the isolation valve.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
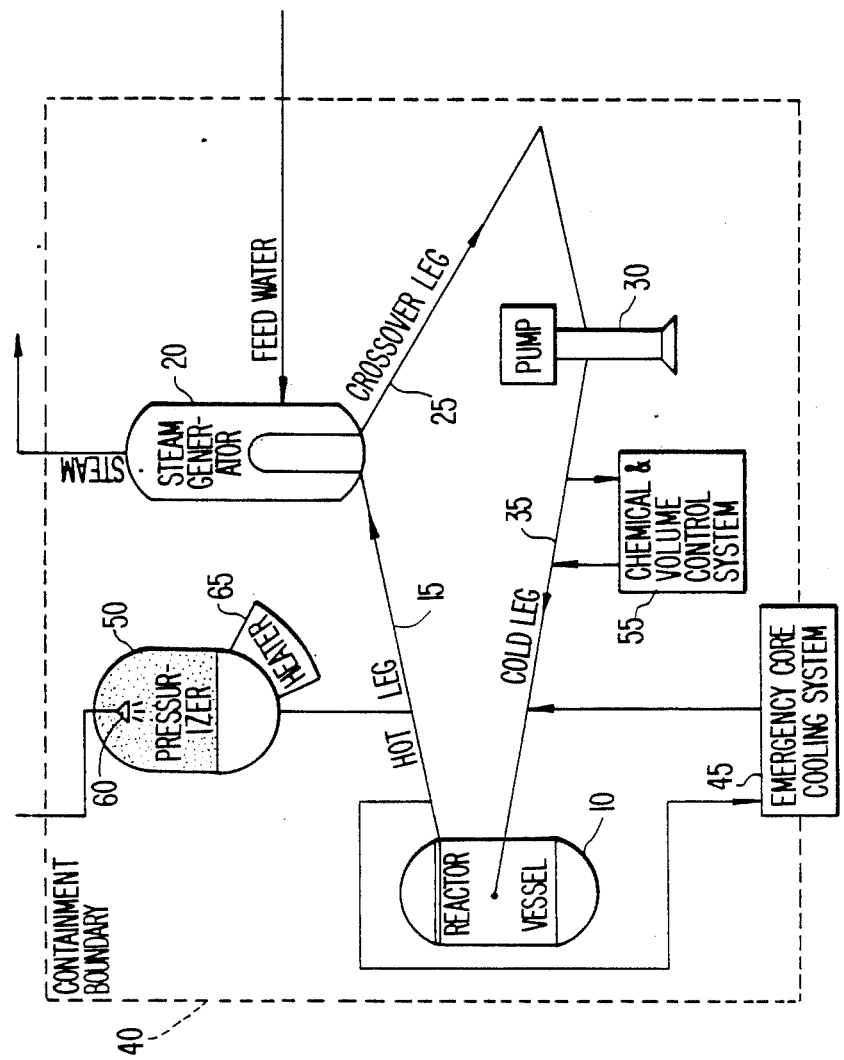
FIG. 1 is a simplified diagram of a pressurized light water nuclear reactor cooling system (RCS)
Figure 2:
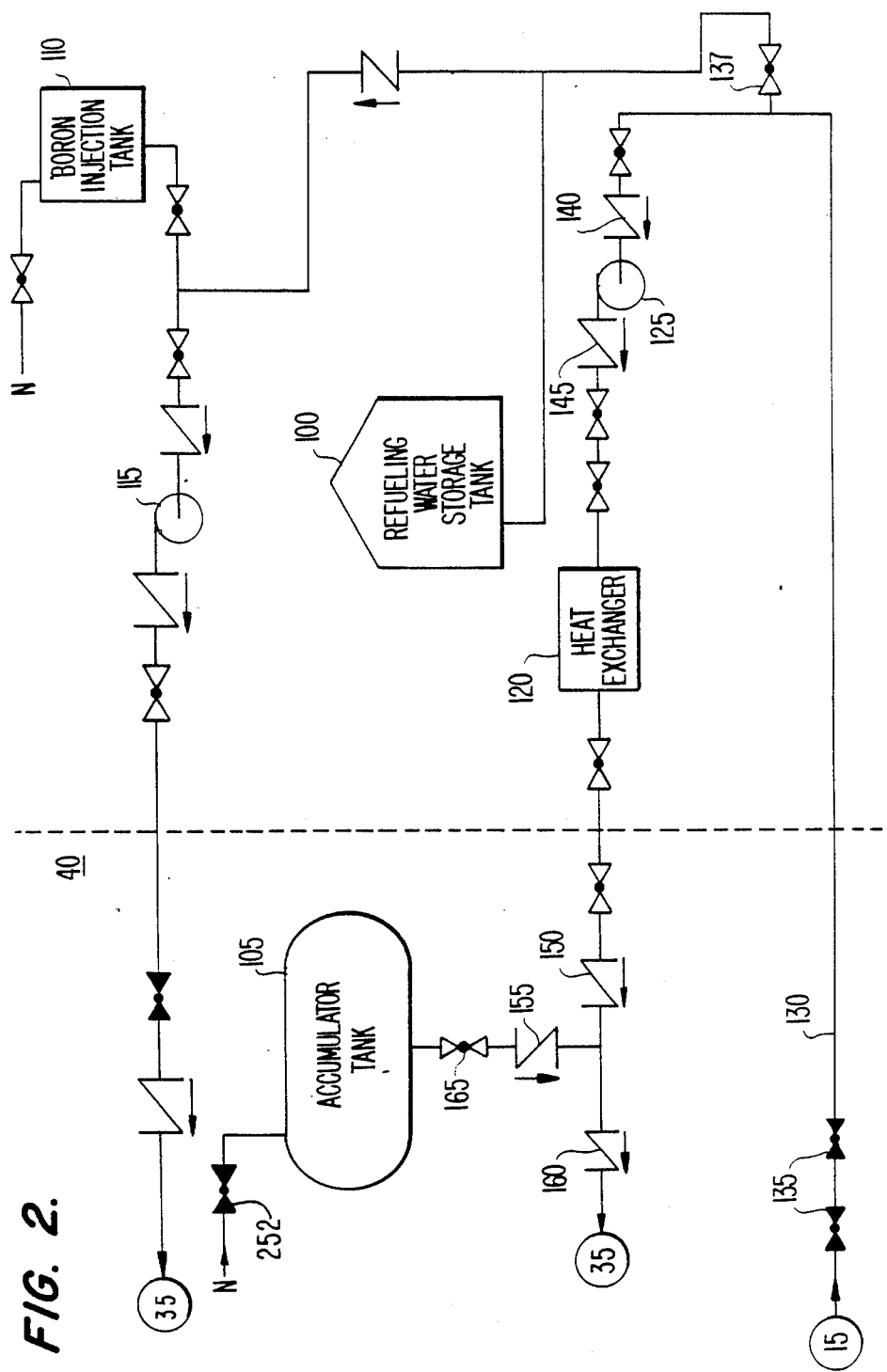
FIG. 2 is a flow diagram of emergency core cooling systems (ECCS) in the reactor cooling system of FIG. 1.

According to the present invention, check valve 155 at the outlet of the accumulator tank 105 in the passive injection system of the emergency cooling systems (ECCS) 45, can be tested by performing a partial or truncated blowdown of the accumulator tank 105 during the cold shutdown of the reactor 10 at a time when the pressure in the reactor cooling system (RCS) is slightly (approximately 100 psig) less than the pressure in the accumulator 105. In order to minimize the effects of the truncated blowdown, the isolation valve 165 is left open for as short a period of time as possible. Thus, according to the present invention, at the appropriate time, the isolation valve 165 is fully stroked open and then immediately closed.

In order to verify that the check valve 155 is operating properly, a preoperational test must be performed under the same conditions which will be used subsequently to provide base line data from which acceptance criteria can be generated. The acceptance criteria would allow for, e.g., 10% variance in the change in pressure and level in the accumulator tank 105. This is a relatively close tolerance considering the short period of time, on the order of 15 seconds, that the isolation valve 165 is open and the resultantly small amount of change which occurs in pressure and level in the accumulator tank 105. Therefore, it is necessary to use pressure measuring devices having high accuracy and automatic recorders to record the changes in pressure and level of the accumulator tank 105 during the pre-operational test as well as the subsequent tests, which are known as "inservice" tests.

Figure 3:
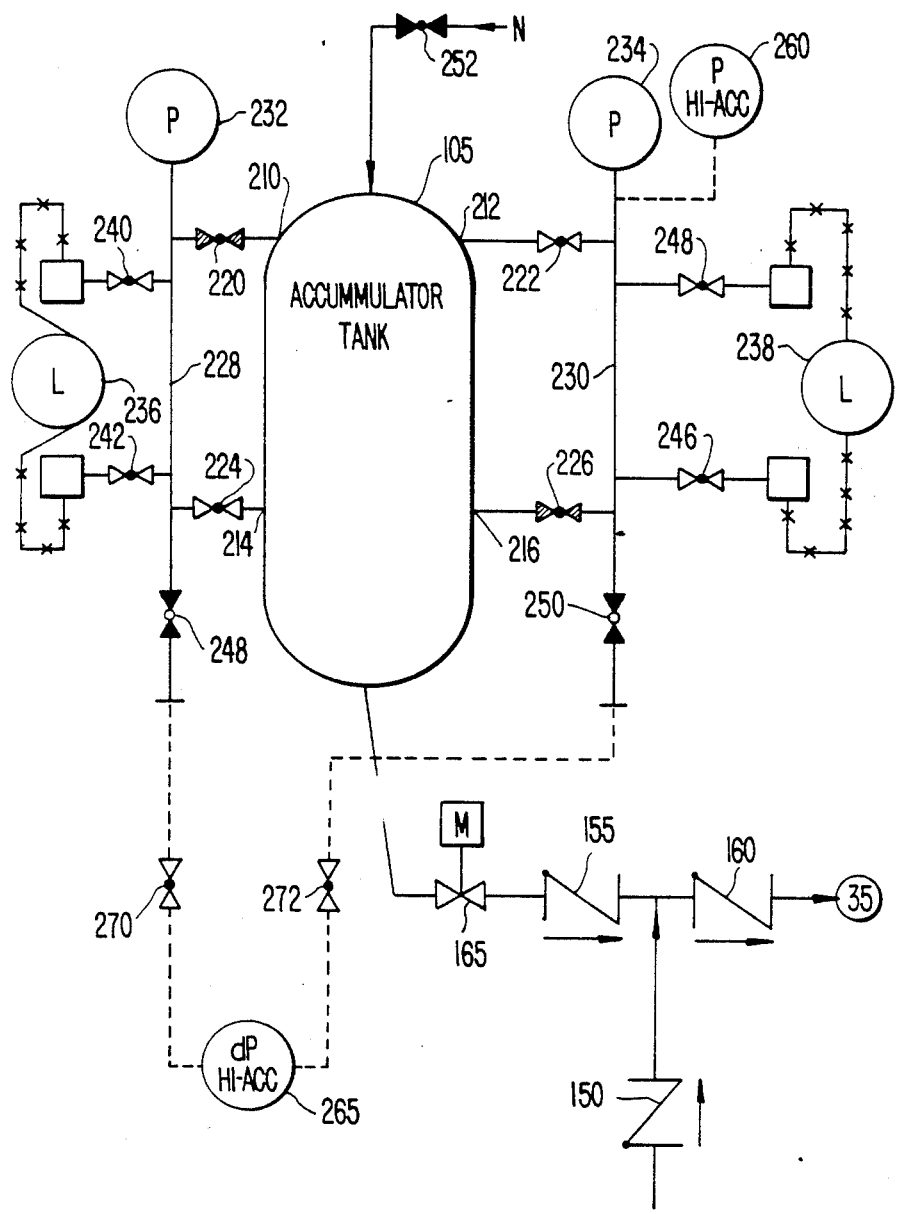
FIG. 3 is a detailed pipe connection diagram of the measuring devices connected to an accumulator tank in the ECCS of FIG. 2.

As illustrated in FIG. 3, a conventional accumulator tank 105 has two upper taps 210 and 212 and two lower taps 214 and 261. These taps are connected via valves 220, 222, 224 and 226, respectively, to standpipes 228 and 230. Pressure measuring devices 232 and 234 are connected to the standpipes 228 and 230 to provide redundant measurements of the pressure in the accumulator tank 105. Level measuring devices 236 and 238 are typically differential pressure measuring devices which are connected to the standpipes 228 and 230, respectively, via valves 240, 242, 244 and 246. All of the valves with reference numerals between 220 and 246 are normally open during operation of the reactor 10. Drain valves 248 and 250, connected to the lower ends of standpipes 228 and 230, are normally closed. Nitrogen can be added at the top of accumulator tank 105 by opening a valve 252 to increase pressure in the accumulator tank 105. Similarly, the pressure in the accumulator 105 can be reduced by venting nitrogen via a vent (not shown).

The conventional measuring devices 232, 234, 236 and 238 are not of sufficient accuracy to provide the necessary data to guarantee that subsequent tests of the check valve 155 meet the acceptance criteria. While it would be possible to use higher accuracy measuring devices in place of the conventional devices, this is unneccessary since it is possible to connect higher accuracy measuring devices only durig a cold shutdown in the manner described below. A high accuracy pressure measuring device 260, such as a HEISE gauge (or equivalent) with a range of approximately 0°–1500° psig, can be connected to one of the standpipes 228 or 230. A high accuracy differential pressure measuring device 265, such as a Heise gauge (or equivalent), can be connected across the drain valves 248 and 250 with or without intervening valves 270 and 272. During the test of the check valve 155, normally open valves 220 and 226 (or 222 and 224) are closed (as indicated by the shading in FIG. 3) and normally closed valves 248 and 250 are opened (as indicated by their unshaded centers) so that the high accuracy differential pressure measuring device 265 can measure the difference in pressure from an upper tap 222 (220) to a lower tap 224 (226). The high accuracy pressure measuring device 260 should be connected to the standpipe 230 (228) having an open upper valve 222 (220) between the standpipe 230 (228) and the accumulator tank 105.

According to the present invention, the cold shutdown procedure of a pressurized light water nuclear reactor is modified as follows. As the temperature and pressure of the RCS are reduced by venting steam from the steam generators 20, at approximately 1000 psig, the emergency core cooling systems (ECCS) 45 are manually locked out as usual to isolate the low pressure systems in the ECCS 45. The temperature reduction is continued and then stabilized at a pressure of approximately 500 psig and a temperature of less than 440° F. During the test of the check valves, the level of the pressurizer 50 is maintained at the normal no-load level, typically approximately 25% full, and letdown flow is maximized into the CVCS 55. The additional high accuracy pressure measuring devices 260 and 265 are installed as described above if the normally connected pressure and level measuring devices are of insufficient accuracy.

Once the above steps are completed, the pressure in the accumulator tank 105 is adjusted to approximately 600 psig by adding nitrogen via valve 252 or venting nitrogen, thereby insuring that, in this embodiment, the designed maximum temperature and pressure transients of the system will not be exceeded. The manual lockout of the isolation valve 165 is removed, thereby supplying power to the isolation valve 165. A recording device or devices, such as a BRUSCH 260, are connected to the high accuracy pressure measuring device 260 and the high accuracy differential pressure measuring device 265, and the recording device(s) are started. Then, the isolation valve 165 at the outlet of the accumulator tank 105 is stroked fully open and immediately closed, at which time the recorder(s) can be stopped. The water level and pressure in the accumulator tank 105 should then be returned to normal and the RCS should be permitted to return to pre-test conditions. This will occur automatically by the operation of the pressurizer 50 and CVCS 55. Since there is normally one accumulator tank 105 per loop of the RCS, in a four-loop RCS, the above described test will be performed four times, once for each of the accumulators 105.

The data recorded during the test should include the pressure in the accumulator 105 versus time, including initial and final pressure, and the level of the accumulator 105 versus time. In addition, RCS pressure versus time, including initial and final values, and initial and final RCS temperature should be recorded. The recorded measurements of the preoperational test should of course be within the designed maximum acceptable temperature and pressure differential transients of the system. The recorded measurements must then be compared with the base line measurements in the acceptance criteria to determine whether they are within ten percent of the base line measurements. If the ten percent requirement is met, the operators of the nuclear power system can be assured that the check valves are operational.

The many features and advantages of the present invention are apparent from the detailed specification which describes the application of the present invention to a specific pressurized light water nuclear power system. However, it is intended by the appended claims to cover all features and advantages of the method which fall within the true spirit and scope of the invention. Thus, the present invention may be applied to other nuclear power systems and other systems utilizing normally closed check valves which are difficult to test. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A method for testing a normally closed check valve connected in series with an isolation valve between an outlet of an accumulator tank, containing a fluid, upstream of the check and isolation valves and a pressurized system downstream of the check and isolation valves, said method comprising the steps of:
   (a) establishing a range for acceptance criteria applicable to test data provided by a test procedure comprising the steps of:
      (ai) adjusting pressure upstream and downstream of the check and closed isolation valves, so that a fixed pressure differential exists wherein the upstream pressure is higher than the downstream pressure;
      (aii) opening and closing the isolation valve to produce the fixed pressure differential across the check valve without totally discharging the fluid in the accumulator tank;
      (aiii) measuring pressure versus time conditions in at least one of the accumulator tank and the pressurized system or the fluid level versus time condition in the accumulator tank; and (aiv) recording measurements of the conditions as the test data;

(b) performing a preoperational test, including at least the test procedure of step (a), to establish base line data in dependence upon the test data recorded in step (aiv);

(c) performing a subsequent test after operation of the pressurized system has begun, the subsequent test being performed according to the test procedure in step (a) to provide subsequent test data in dependence upon the test data recorded in step (aiv);

(d) determining any differences between the base line and subsequent test data; and (e) comparing the differences between the base line data and the subsequent test data to determine whether the differences are within the range of the acceptance criteria to verify operability of the check valve.

2. A method as recited in claim 1, wherein the pressurized system includes high and low pressure systems, and wherein the test procedure in step (a) further comprises the step of:

(aiv) isolating the check valve from the low pressure system prior to step (aiii).

3. A method as recited in claim 1, wherein the pressurized system is designed withstand maximum acceptable pressure and temperature differential transients that may be caused by actuation of the check valve, and wherein:

step (ai) comprises adjusting the upstream and downstream pressures to a pressure differential therebetween which prevents actual pressure and temperature differential transients resulting from said opening and closing of the isolation valve in step (aii) from exceeding the maximum acceptable pressure and temperature differential transients.

4. A method as recited in claim 3, wherein the downstream pressure has a normal pressure level, and wherein:

step (ai) comprises the step of lowering the downstream pressure to a pressure level which is less than one-fourth of the normal pressure level.

5. A method as recited in claim 4, wherein the normal pressure level of the downstream pressure is approximately 2250 psig, and wherein:

step (ai) includes adjusting the pressure level of the downstream pressure to approximately 500 psig and the pressure level of the upstream pressure to approximately 600 psig.

6. A method as recited in claim 3, wherein the pressure differential is approximately 100 psig.

7. A method as recited in claim 1, wherein step (aii) includes completely opening and then immediately closing the isolation valve.

8. A method as recited in claim 1, wherein:

step (aiii) comprises making measurments of the upstream and downstream pressures versus time during step (aii), step (aiv) comprises recording the measurements of the upstream and downstream pressures versus time during step (aii), and step (e) comprises comparing the acceptance criteria to differences in the measurements of the upstream and downstream pressures versus time obtained in the preoperational test and the subsequent test.

9. A method as recited in claim 8, wherein the accumulator tank has a fluid level and an interior pressure equal to the upstream pressure, wherein:

step (aiv) further comprises the step of recording measurements of fluid level change versus time in the accumulator tank during step (aii), and step (d) further comprises comparing the acceptance criteria to any difference between the preoperational and subsequent tests in the measurements of the fluid level change versus time in the accumulator tank.

10. A method as recited in claim 9, wherein the accumulator tank has at least two upper taps and at least two lower taps for measuring the interior pressure and the fluid level of the accumulator tank, at least two standpipes being connected via valves to corresponding ones of the upper and lower taps with drain valves connected at the lower end of the standpipes, wherein said test procedure in step (a) further comprises the steps of:

(av) connecting a high accuracy differential pressure measuring device to the drain valves connected to the at least two standpipes;

(avi) connecting a high accuracy pressure measuring device to one of the standpipes; and (avii) closing the valves between one of the standpipes and the upper tap connected thereto and between the other standpipe and the lower tap connected thereto, steps (av), (avi) and (avii) being performed prior to step (aii), and wherein step (aiv) includes recording the pressure measured by the high accuracy pressure measuring device and the high accuracy differential pressure measuring device.

11. A method for testing a normally closed check valve connected in series with an isolation valve at an outlet of an accumulator tank in a passive injection system for supplying liquid to a reactor cooling system in a presurized light water nuclear power system, the passive injection system being connected to a low pressure system, said method comprising the steps of:

(a) establishing a range for acceptance criteria applicable to test data provided by a test procedure comprising the steps of:

(ai) isolating the passive injection system from the low pressure system;

(aii) adjusting upstream pressure in the accumulator tank upstream of the check and isolation valves, as necessary to attain a first pressure level, and downstream pressure in the reactor cooling system downstream of the check and isolation valves, as necessary to attain a second pressure level lower than the first pressure level;

(aiii) opening and closing the isolation valve; and (aiv) measuring the upstream and downstream pressures during step (aiii);

(b) performing a preoperational test including the test procedure of step (a) to establish base line data;

(c) performing a subsequent test after operation of the pressurized light water nuclear power system has begun, the subsequent test being performed according to the test procedure in step (a) to provide subsequent test data; and (d) determining any differences between the base line and subsequent test data; and (e) comparing the differences between the base line data and the subsequent test data to determine whether the differences are within the range of the acceptance criteria to verify operability of the check valve.

12. A method as recited in claim 11, wherein step (aii) includes adjusting the upstream and downstream pressures so that a difference between the first and second pressure levels is sufficiently small whereby a pressure transient generated by said opening and closing in step (aiii) is within design transients for the reactor cooling system and the passive injection system.

13. A method as recited in claim 12, wherein the reactor cooling system has a normal pressure level and the second pressure level is less than one-fourth of the normal pressure level.

14. A method as recited in claim 13, wherein the normal pressure level is approximately 2250 psig, the first pressure level is approximately 600 psig and the second pressure level is approximately 500 psig.

15. A method as recited in claim 14, wherein said isolating in step (ai) is performed when the downstream pressure is approximately 1000 psig.

16. A method as recited in claim 11, wherein step (aiii) includes completely opening the isolation valve and then immediately closing the isolation valve.

17. A method for testing a normally closed check valve connected in series with an isolation valve at an outlet of an accumulator tank in a passive injection system for supplying liquid to a reactor cooling system in a pressurized light water nuclear power system, the passive injection system being connected to a low pressure system and supplying liquid to the reactor cooling system only during abnormally low pressure in the reactor cooling system, the accumulator tank having at least two upper taps and at least two lower taps with at least two standpipes each connected to a corresponding pair of upper and lower taps via valves and each of the standpipes having lower ends with drain valves connected thereto, said method comprising the steps of:
  (a) establishing a range for acceptance criteria applicable to test data provided by a test procedure comprising the steps of:
    (ai) connecting a high accuracy differential pressure measuring device to the drain valves connected to the at least two standpipes;
    (aii) connecting a high accuracy pressure measuring device to one of the at least two standpipes;
    (aiii) closing one of the valves connected between one of the standpipes and one of the upper taps and another of the valves connected between the other standpipes and the lower tap connected thereto;
    (aiv) isolating the passive injection system from the low pressure system;
    (av) adjusting upstream pressure in the accumulator tank upstream of the check and isolation valves as necessary to attain a first pressure level;
    (avi) adjusting downstream pressure in the reactor cooling system downstream of the check and isolation valves as necessary to attain a second pressure level lower than the first pressure level;
    (avii) opening the isolation valve completely and then immediately closing the isolation valve;
    (aviii) recording differential pressure versus time measured by the differential pressure measuring device during step (avii) as indicating a change in level in the accumulator tank;
    (aix) recording pressure versus time measured by the high accuracy pressure measuring device; and
    (ax) recording downstream pressure versus time in the reactor cooling system during step (avii);
  (b) performing a preoperational test including the test procedure of step (a);
  (c) performing a subsequent test after operation of the pressurized light water nuclear power system has begun, the subsequent test being performed according to the test procedure in step (a);
  (d) determining any differences between the pressures versus time recorded in steps (aviii), (aix) and (ax) during the preoperational test and the subsequent test, respectively; and
  (e) comparing the differences determined in step (d) to determine whether the differences are within the acceptance cirteria to verify operability of the check valves.

18. A method as recited in claim 17, wherein the reactor cooling system has a normal pressure, the second pressure level is less that one-fourth of the normal pressure level and the first pressure level is approximately 100 psig greater than the second pressure level.

19. A method as recited in claim 18, wherein the first pressure level is approximately 600 psig and the second pressure level is approximately 500 psig.

20. A method as recited in claim 19, wherein said isolating in step (aiv) is performed when the downstream pressure is approximately 1000 psig.

21. A method for testing a check valve connected in series with an isolation valve between an outlet of an accumulator tank, containing a fluid having a pressure, disposed upstream of the check and isolation valves, and a pressurized system disposed downstream of the check and isolation valves, the check valve being normally closed and permitting the fluid to flow only from the accumulator tank into the pressurized system, the fluid flowing through the check valve only when the isolation valve is open and the pressurized system has a pressure lower than the pressure of the accumulator tank, the flowing of the fluid caused by actuation of the check valve resulting in a change in at least one of fluid level in the accumulator tank and pressure in at least one of the accumulator tank and the pressurized system, said method comprising the steps of:
  (a) establishing a range for acceptance criteria applicable to test data provided by a test procedure comprising the steps of:
    (ai) adjusting at least one of upstream and downstream pressure, upstream and downstream of the check and isolation valves, so that a fixed pressure differential exists where the upstream pressure is higher than the downstream pressure;
    (aii) opening and closing the isolation valve to produce the fixed pressure differential across the check valve without totally discharging the fluid in the accumulator tank;
    (aiii) measuring pressure versus time conditions in at least one of the accumulator tank and the pressurized system or fluid level versus time condition in the accumulator tank during step (aii); and
    (aiv) recording the conditions measured in step (aiii) as the test data;
  (b) performing a preoperational test, including at least the test procedure of step (a), to establish base line data in dependence upon the test data recorded in step (aiv);
  (c) performing a subsequent test after operation of the pressurized system has begun, the subsequent test being performed according to the test procedure in step (a) to provide subsequent test data in dependence upon the test data recorded in step (aiv);

(d) determining any differences between the base line and subsequent test data; and (e) comparing the differences between the base line data and the subsequent test data to determine whether the differences are within the range of the acceptance criteria to verify operability of the check valve.

* * * * *